United States Patent
Hillar et al.

(10) Patent No.: US 10,701,376 B2
(45) Date of Patent: Jun. 30, 2020

(54) RESILIENT IMAGE COMPRESSION AND DECOMPRESSION

(71) Applicant: Awecom, Inc., San Francisco, CA (US)

(72) Inventors: Christopher J. Hillar, San Francisco, CA (US); Ram Mehta, San Francisco, CA (US); Kilian Koepsell, San Francisco, CA (US); Charles Garfinkle, Ottawa (CA)

(73) Assignee: AWECOM, INC., San Francisco, CA (US)

( * ) Notice: Subject to any disclaimer, the term of this patent is extended or adjusted under 35 U.S.C. 154(b) by 139 days.

(21) Appl. No.: 16/027,759

(22) Filed: Jul. 5, 2018

(65) Prior Publication Data
US 2020/0014942 A1 Jan. 9, 2020

(51) Int. Cl.
*H04N 19/33* (2014.01)
*H04N 11/02* (2006.01)
*H04N 19/60* (2014.01)
*H04N 19/423* (2014.01)

(52) U.S. Cl.
CPC ............ *H04N 19/33* (2014.11); *H04N 11/02* (2013.01); *H04N 19/423* (2014.11); *H04N 19/60* (2014.11)

(58) Field of Classification Search
CPC ........ H04N 19/33; H04N 11/02; H04N 19/60; H04N 19/423
See application file for complete search history.

(56) References Cited

U.S. PATENT DOCUMENTS

| | | | | |
|---|---|---|---|---|
| 9,496,893 | B1* | 11/2016 | Strohm, III | H03M 7/40 |
| 2003/0231617 | A1* | 12/2003 | Ubale | H04B 3/23 |
| | | | | 370/352 |
| 2006/0002613 | A1* | 1/2006 | Zurov | H04N 19/647 |
| | | | | 382/240 |
| 2007/0242891 | A1* | 10/2007 | Fan | H04N 19/63 |
| | | | | 382/233 |
| 2013/0287312 | A1* | 10/2013 | Minezawa | H04N 19/117 |
| | | | | 382/233 |

(Continued)

OTHER PUBLICATIONS

Chil-Cheang MA, et al., "Efficient Shape Coding Algorithm by Quadtree Decomposition for MPEG-4," Proc. of SPIE, Apr. 19, 2000.

(Continued)

*Primary Examiner* — Ming Y Hon
(74) *Attorney, Agent, or Firm* — Steven M. Greenberg, Esq.; Shutts & Bowen LLP (57) ABSTRACT

An image processing method includes selecting an image in fixed storage of a computer and loading the selected image into memory of the computer. The method further includes representing the loaded image by a processor of the computer in the memory as an initial two-dimensional array of pixel values. Thereafter, the initial two-dimensional array of pixel values may be transformed into a hierarchy of progressively axially decremented two-dimensional arrays of signs and a pair of one-dimensional values for each 2×2 array of signs amongst the decremented two-dimensional arrays of signs. Finally, each of the two-dimensional arrays of signs and each pair of one-dimensional values may be stored in the fixed storage as a compressed form of the selected image.

15 Claims, 3 Drawing Sheets

(56) References Cited

U.S. PATENT DOCUMENTS

2016/0165244 A1    6/2016   Bordes et al.
2016/0204798 A1*   7/2016   Ackerman .......... G06F 16/1744
                                                                  341/63

OTHER PUBLICATIONS

Tzou K-H Ed, "Progressive Image Transmission: A Review and Comparison of Techniques," Optical Engineering Society, Bellingham, vol. 26, No. 7, Jul. 1987.
Huang, "Institute of Electrical and Electronics Engineers: Walsh-Hadamard-Haar Hybrid Transforms," Proc. of the Int. Joint Conf. on Pattern Recognition, Miami, Dec. 1980.

* cited by examiner

RESILIENT IMAGE COMPRESSION AND DECOMPRESSION

BACKGROUND OF THE INVENTION

Field of the Invention

The present invention relates to the field of image processing and more particularly, to image compression and decompression in light of signal loss, corruption and network bandwidth fluctuation.

Description of the Related Art

An image is a two-dimensional analog signal processed by the mammalian visual system—namely the eye in concert with the brain. Computing technologies, however, are able to process imagery in a manner analogous to the mammalian eye, but to do so requires a digital representation of the analog signal. Thus, as a matter of course, image processing computing systems convert the analog signal reflective of an image into a digital representation—typically a two-dimensional array of pixels in a grid. But, storing a two-dimensional array of pixels for a large image, particularly a color image, is not without consequence. Indeed, as it is commonly understood, the storage space required to store a multiplicity of digital images can be quite large. As well, transmitting digital imagery over a computer communications network can prove troublesome owing to the large size of some images and the limited communications bandwidth through which the image is to be transmitted.

For these reasons, image compression has proven a vital aspect of computing. Image compression, generally speaking, is a process by which the storage space requirement of an image is reduced. Image compression may be lossy or lossless. Lossless compression involves compressing imagery into a compressed form, which, when decompressed, is an exact replica of the original imagery. But, in lossy compression, some of the finer details in the image are sacrificed so as to achieve even greater reductions in size of the original image. Today, many different image compression techniques, both lossless and lossy, exist, with each varying depending upon a desired outcome: a highest possible compression ratio, in view of a best possible image quality, in view of a shortest computation time, utilizing as little computational resources as possible, in view of noise resilience and signal progessivity.

BRIEF SUMMARY OF THE INVENTION

Embodiments of the present invention address deficiencies of the art in respect to image compression and decompression and provide a novel and non-obvious method, system and computer program product for image processing. In an embodiment of the invention, an image processing method includes selecting an image in fixed storage of a computer and loading the selected image into memory of the computer. The method further includes representing the loaded image by a processor of the computer in the memory as an initial two-dimensional array of pixel values. Thereafter, the initial two-dimensional array of pixel values may be transformed into a hierarchy of progressively axially decremented two-dimensional arrays of signs and a pair of one-dimensional values for each 2×2 array of signs amongst the decremented two-dimensional arrays of signs. Finally, each of the two-dimensional arrays of signs and each pair of one-dimensional values may be stored in the fixed storage as a compressed form of the selected image.

Once the compressed form of the selected image has been stored in the fixed storage, the compressed form may be decompressed as follows. First, the hierarchy is loaded into the memory of the computer. Thereafter, a reconstructed two-dimensional array of pixel values may be generated from the hierarchy of progressively axially decremented two-dimensional arrays of signs and the pair of one-dimensional values for each 2×2 array of signs amongst the decremented two-dimensional arrays of signs. The reconstructed two-dimensional array of pixel values may then be displayed as the original image in a display of the computer.

In one aspect of the embodiment, the transformation of the initial two-dimensional array of pixel values into the hierarchy includes a discrete, recursive encoding process. The encoding process includes submitting the initial two-dimensional array to a recursive encoding operation and producing a bit stream representative. The recursive encoding operation receives as input, a grid of specified dimension and produces two possible outputs. First, on the condition that the grid has a specified dimension of 1×1, the recursive encoding operation produces as output a serialized form of the grid. But, on the condition that the grid has a specified dimension larger than 1×1, the recursive encoding operation produces as output a concatenation of two encoded grids of a dimensionality half that of the specified dimension, and a serialization of a sign array accounting for element-wise signs of positive or negative for an absolute value of a sum of the grid and an up-sampled form of a negated form of a decoded form of an output produced by the encoding operation receiving as input a down-sampled form of the grid. Consequently, the concatenation after all recursive calls to the encoding operation have unwound, defines the hierarchy.

In another aspect of the embodiment, reconstruction of the two-dimensional array of pixel values of the initial image includes a discrete, recursive decoding process. The decoding process includes loading the hierarchy into the memory of the computer and generating a reconstructed two-dimensional array of pixel values from the hierarchy of progressively axially decremented two-dimensional arrays of signs and the pair of one-dimensional values for each 2×2 array of signs amongst the decremented two-dimensional arrays of signs. Specifically, the hierarchy defined by the concatenation may be submitted to a recursive decoding operation that receives as input, a data stream indicating a dimension. The decoding operation then produces two possible outputs. The first output may be produced on the condition that the indicated dimension is 1×1, as a de-serialized form of the data stream.

However, on the condition that the indicated dimension is greater than 1×1, the decoding operation produces as output a grid of pixel values resulting from a summation of (1) an up-sampled form of a first output grid produced by the decoding operation receiving as input a first portion of the de-concatenated concatenation that is of a dimension half that of the indicated dimension, with (2) an element-wise product of a de-serialized second sign array portion of the de-concatenated concatenation and an up-sampled form of a third output grid produced by the decoding operation receiving as input a third portion of the de-concatenated concatenation that is of a dimension half that of the indicated dimension. Thereafter, the summation after all recursive calls to the decoding operation have unwound, defines the reconstructed two-dimensional array of pixel values.

In another embodiment of the invention, an image processing data processing system includes a host computer with memory and at least one central processing unit (CPU). The system also includes fixed storage storing an image. Finally, the system includes an image processing module. The module includes computer program instructions executing in the memory of the computer which are adapted to select an image in the fixed storage, load the selected image into the memory, represent the loaded image in the memory by the CPU as an initial two-dimensional array of pixel values, transform by the CPU the initial two-dimensional array of pixel values into a hierarchy of progressively axially decremented two-dimensional arrays of signs and a pair of one-dimensional values for each 2×2 array of signs amongst the decremented two-dimensional arrays of signs, and store by the CPU in the fixed storage each of the two-dimensional arrays of signs and each pair of one-dimensional values as a compressed form of the selected image.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for hierarchical image encoding. In accordance with an embodiment of the invention, an original image may be compressed through a recursive encoding process of a representative grid so as to produce a hierarchical tree of nodes which each non-leaf node of the tree representing a different sign array of progressively reduced dimensions beginning at a dimension of the representative grid and culminating with a set of 2×2 grids. The leaf nodes in turn, represent different 1×1 down-sampled pixels from corresponding 2×2 grids derived from the original grid. Once the hierarchical tree has been produced, the tree may be stored as a compressed form of the original image. A reconstruction of the original image may then be produced through a recursive decoding process in which the 1×1 pixels of the leaf nodes of the hierarchical tree are up-sampled and combined with the sign arrays of progressively higher dimensions until a final grid of the same dimension as that of the original image is produced. In this way, a reasonable compression ratio may be obtained through reasonable utilization of processing resources while providing for a resilient, lossy compressed representation of the original image whereas conventional compression lacks the same resiliency and progressive decoding afforded by the hierarchical tree.

Figure 1:
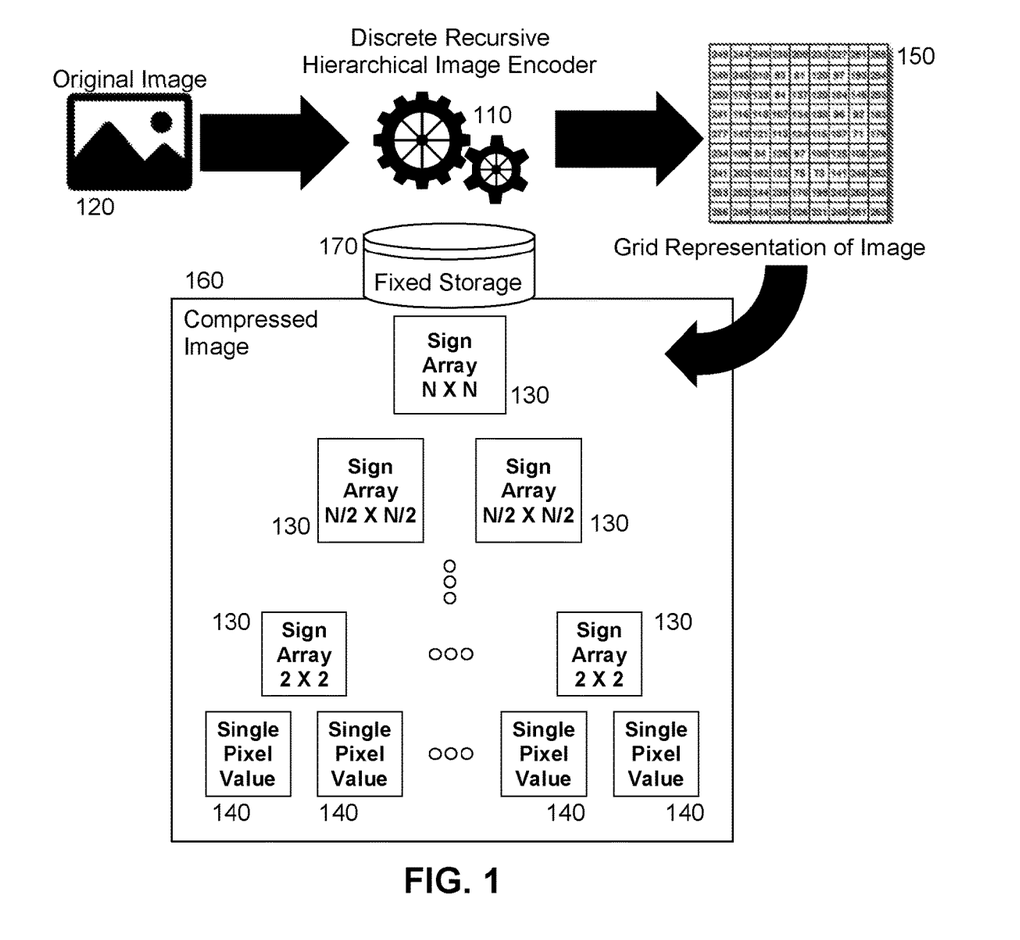
FIG. 1 is a pictorial illustration of process for hierarchical image encoding.

In further illustration, FIG. 1 pictorially shows a process for hierarchical image encoding. As shown in FIG. 1, an original image 120 is loaded into memory of a computing system and discrete recursive hierarchical image encoder 110 produces in memory a grid representation 150 of the original image 120. The grid representation 150 is of a particular N×N dimensionality and includes different cells encapsulating an intensity value. An exemplary intensity value may include an eight-bit value for a gray value. The discrete recursive hierarchical image encoder 110 processes the grid representation 150 by transforming the grid representation 150 into a hierarchy of progressively axially decremented two-dimensional arrays of signs 130 and a pair of one-dimensional values 140 for each 2×2 array of signs 130 amongst the decremented two-dimensional arrays of signs 130. The hierarchy is then stored in fixed storage 170 as a compressed form 160 of the original image 120. Thereafter, a reconstructed form of the original image 120 may be obtained by a decoding process operable upon the hierarchy of progressively axially decremented two-dimensional arrays of signs 130 and the pair of one-dimensional values 140 for each 2×2 array of signs 130 amongst the decremented two-dimensional arrays of signs 130.

It is to be understood that while the foregoing process is shown to have been implemented in connection with a gray-scale image of a grid of single intensity values, the foregoing process may be extended to color imagery. In this regard, to extend the foregoing process for color imagery, a presence of three scalar values in each cell of the grid is assumed, for example in correspondence to intensity values for the colors red, green and blue, or in the alternative, a first gray-scale intensity value and then two chroma intensity values, also known as the "YUV" color space. The process of the present invention is thus repeated three times, once for each value in the troika of values so as to produce three different hierarchies.

Figure 2:
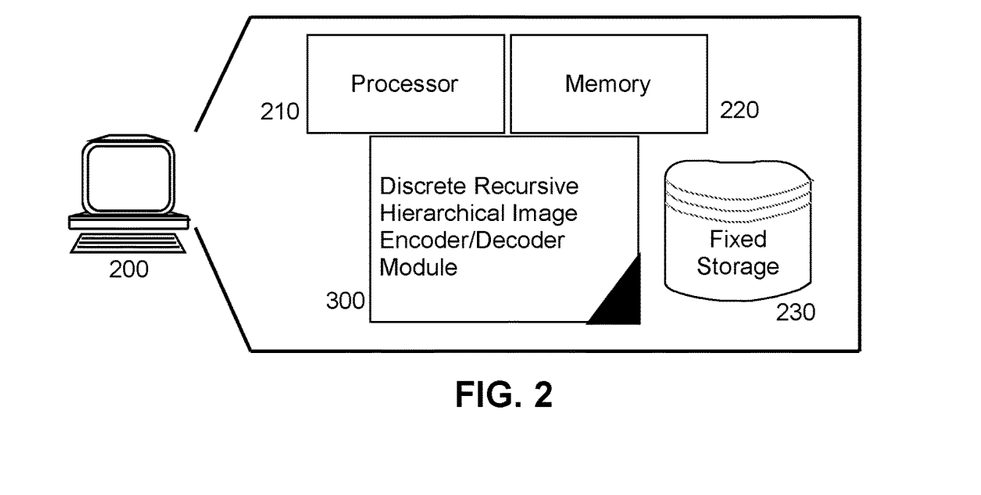
FIG. 2 is a schematic illustration of a data processing system configured for discrete recursive hierarchical image encoding and decoding.

The process described in connection with FIG. 1 may be implemented in a data processing system. In further illustration, FIG. 2 schematically shows a data processing system configured for discrete recursive hierarchical image encoding and decoding. The system includes a host computer 200 with at least one CPU 210 and memory 220 and fixed storage 230. The system also includes a discrete recursive hierarchical image encoder/decoder module 300. The module 300 includes computer program instructions that when executed by the CPU 210, are operable to retrieve into memory 220 from the fixed storage 230 an original image and to produce in the memory 220, a grid representation of the original image. The program instructions are further operable to process the grid representation by transforming the grid representation into a hierarchy of progressively axially decremented two-dimensional arrays of signs and a pair of one-dimensional values for each 2×2 array of signs amongst the decremented two-dimensional arrays of signs, and to store the hierarchy in the fixed storage 230. Conversely, the program instructions also are operable to reconstruct the original image in memory 220 by decoding the hierarchy of progressively axially decremented two-dimensional arrays of signs and the pair of one-dimensional values for each 2×2 array of signs amongst the decremented two-dimensional arrays of signs.

Figure 3:
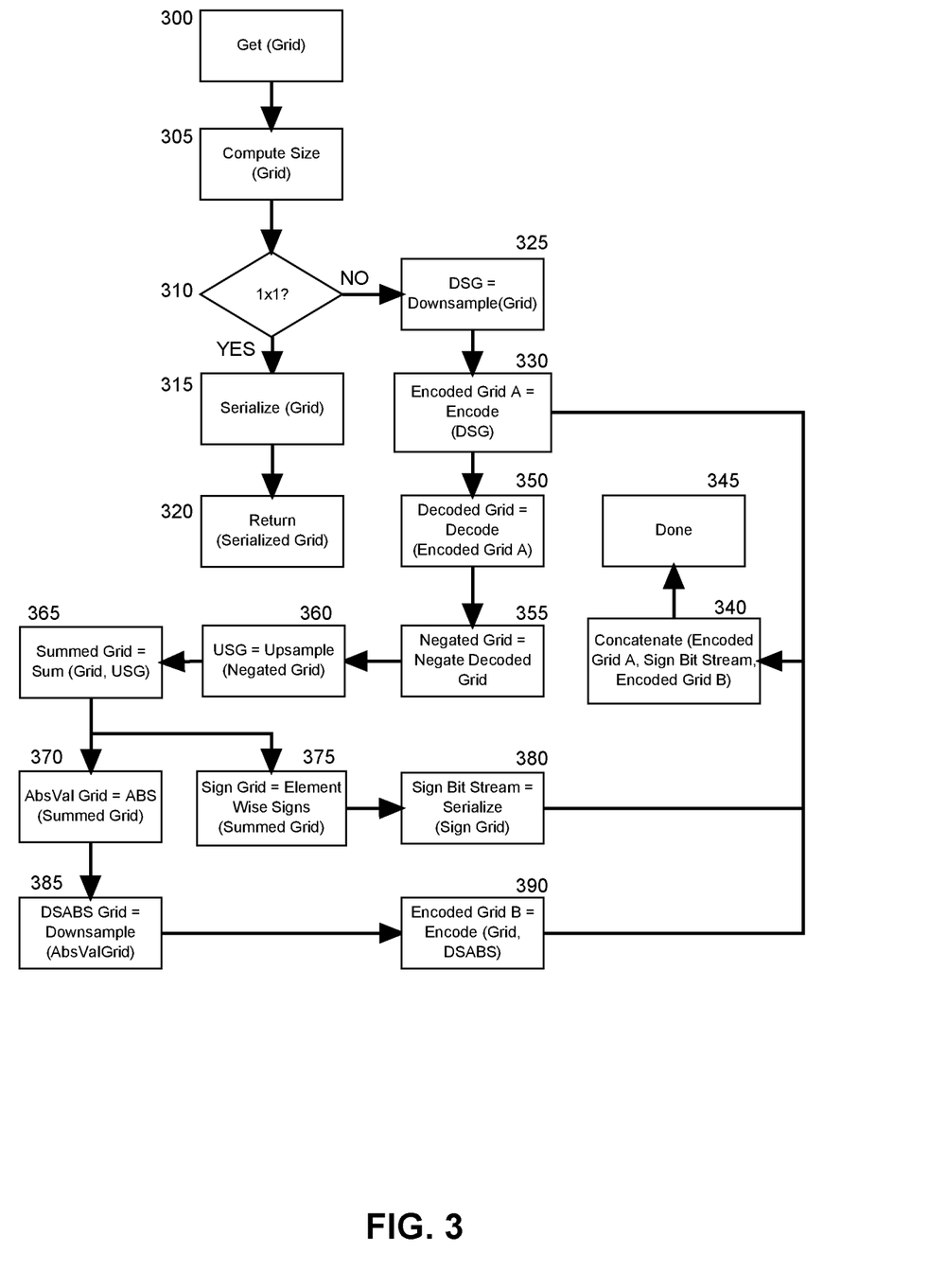
FIG. 3 is a flow chart illustrating a process for discrete, recursive, hierarchical image encoding; and, FIG. 4 is a flow chart illustrating a process for discrete, recursive, hierarchical image decoding.

In yet further illustration of the operation of the program instructions during an encoding process, FIG. 3 is a flow chart illustrating a process for discrete, recursive, hierarchical image encoding. Beginning in block 300, an encoding process receives an input grid for processing, that is of a dimensionality that ranges from an N×N dimension of the grid representation of the original image, to a single 1×1 pixel of the grid representation. In block 305, the dimension of the input grid is determined and in decision block 310, if the dimension is determined to be a single pixel, in block 315, the single pixel is serialized into a sequence of bit values and returned to a calling operation in block 320. In decision block 310, though, if the dimension is determined to be greater than 1×1, then the process continues in block 325.

Figure 4:
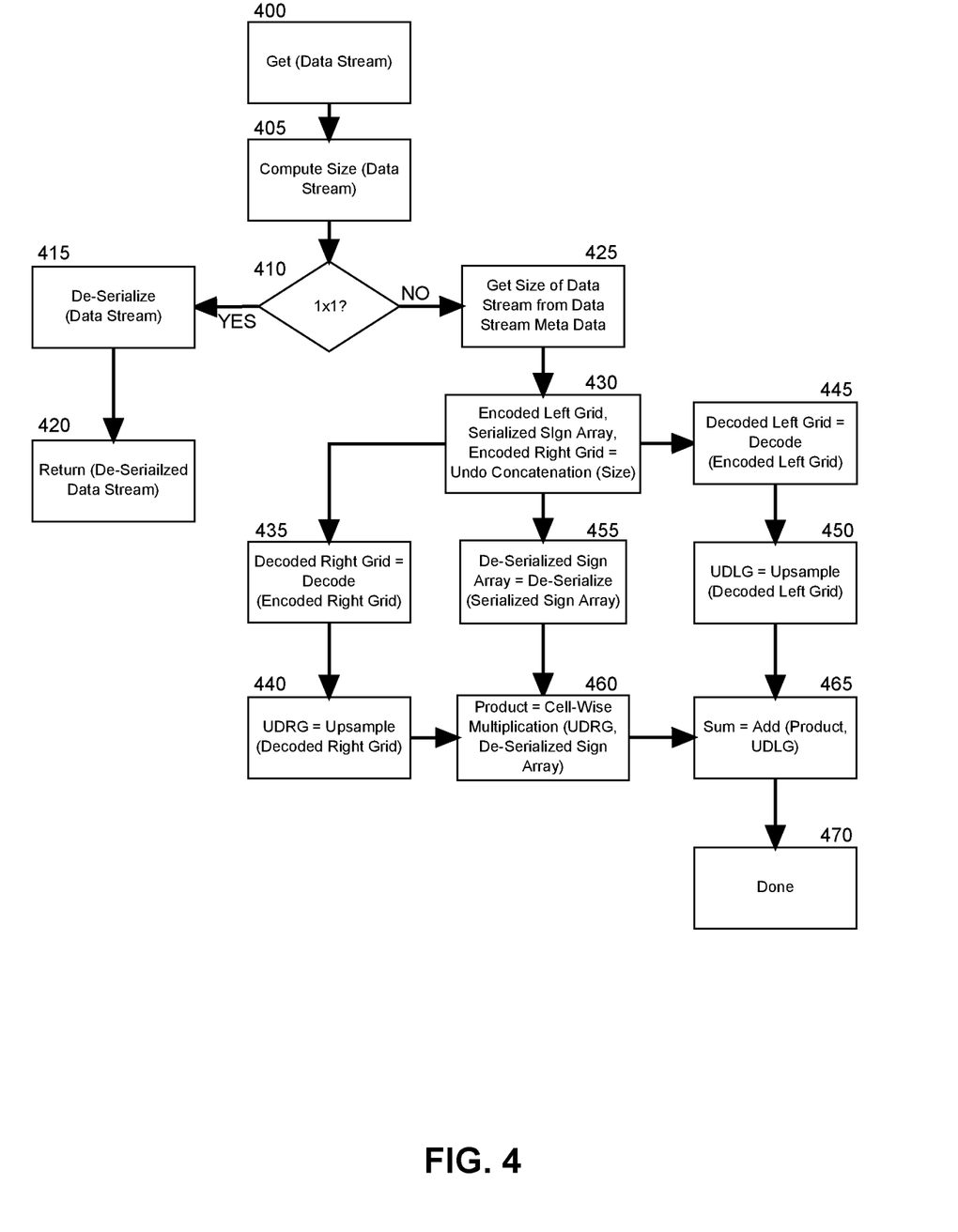

In block 325, the input grid is down-sampled to produce a down-sampled grid. By down-sampling, it is meant that, as one example, for each successive 2×2 portion of the input grid, the pixel values of each cell of the portion are averaged together to produce an average value that then forms a correspondent cell in the down-sampled grid such that the down-sampled grid is of a dimensionality that is half that of the input grid. However, it is to be recognized that other techniques are permissible including the use of Lanczos resampling to provide improved quality. Then, in block 330, the encoding process is recursively called with the down-sampled grid provided as the input grid in block 300. Upon return from a recursively called instance of the encoding process, the returned serialized grid is stored for concatenation. Concurrently, in block 350, the returned serialized grid is subjected to a decoding process so as to produce a decoded grid. In this regard, the decoding process, described more fully in FIG. 4, is operable to produce an intermediate reconstruction of the returned serialized grid provided as input to the decoding process.

In block 355, the decoded grid is first negated and then up-sampled in block 360. By up-sampling, it is meant that each underlying cell of the subject grid produces a 2×2 grid of cells each with the same value of the underlying cell of the subject grid so that the combination of the produced 2×2 grids generates an output, up-sampled grid of twice the dimensionality as the subject grid. As such, in block 365, the up-sampled grid and the input grid are summed through cell-wise addition and in block 370, a cell-wise absolute value grid of the summed grid is computed. Concurrently, in block 375 a sign grid is derived from the summed grid by assigning a positive or negative sign to each cell of the sign grid in relation to the sign of the pixel value in a corresponding cell in the summed grid. In block 380, the resultant sign grid is serialized into a bit stream and stored for concatenation.

In block 385, the cell-wise absolute value grid is down-sampled to produce a down-sampled absolute value grid. Then, in block 390 the down-sampled absolute value grid is provided as input in block 300 to a recursively called instance of the encoding process. The resultant serialized grid is then stored for concatenation. Finally, in block 340, the serialized sign grid of block 380 and the resultant serialized grids of blocks 330 and 390 are concatenated together in block 340. Because of the ordering of concatenation of the serialized sign grid of block 380 and the resultant serialized grids of blocks 330 and 390, during reconstruction of the image, as the bit stream is received by the decoder, the representation of the image to be reconstructed may be reconstructed progressively, bit by bit in order to permit the continuous decoding of the underlying image.

In an alternative aspect of the embodiment, the ordering of concatenation may vary to achieve a higher degree of compression, while foregoing the opportunity for progressive reconstruction. Specifically, in the alternative aspect, the ordering of concatenation may begin with the resultant serialized grids of blocks 330 and 390, followed by the serialized sign grid of block 380. Consequently, greater compression can be achieved because during de-concatenation, decoding of the encoded grid elements of the decoded form of the resultant serialized grid of block 390 that are valued at zero implicate an irrelevance of a corresponding sign bit so as to obviate the need to perform a cell-wise multiplication of any zero valued 2×2 up-sampled form of the decoded form of the resultant serialized grid of block 390 during the decoding process, thus trimming four bits from the sign array portion of the concatenation.

In any event, following the concatenation of block 340, the concatenation reflective of a portion of the intended hierarchy is then returned 345 as the output of the encoding process to the calling process, including, for example, another instance of the encoding process. When all instances of the encoding process have completed execution, the final concatenation will be a bit stream indicative of the hierarchy of progressively axially decremented two-dimensional arrays of signs and the pair of one-dimensional values for each 2×2 array of signs amongst the decremented two-dimensional arrays of signs.

As explained herein, the encoding process of FIG. 3 incorporates a function call to a recursive decoding process. In even yet further illustration, FIG. 4 is a flow chart illustrating a process for discrete, recursive, hierarchical image decoding. Beginning in block 400, a data stream is received for decoding, generally reflective of a portion or all of a hierarchy of progressively axially decremented two-dimensional arrays of signs and the pair of one-dimensional values for each 2×2 array of signs amongst the decremented two-dimensional arrays of signs. In block 405, a size of the portion of the hierarchy is determined—namely a dimensionality of each sign array disposed in the portion of the hierarchy, for instance by consulting meta-data associated with the data stream. Then, in decision block 410, it is determined if the size indicates a 1×1 dimensionality. If so, in block 415 the data stream is de-serialized and the de-serialized data stream returned to the calling function which may include another instance of the decoding function or an instance of the encoding function.

In decision block 410, if it is determined that the size indicates a grid of greater than 1×1 dimensionality, in block 425, the size of the data stream again is determined and in block 430, the portion of the hierarchy is de-concatenated utilizing the known size so as to extract an encoded left grid, a serialized sign array and an encoded right grid. In block 435, the encoded left grid is submitted as an input data stream to another recursive instance of decoding process, and the encoded right grid is submitted as an input data stream to yet another recursive instance of the decoding process in block 445. In block 440, the resultant decoded grid from the encoded left grid is up-sampled in block 440 and multiplied in block 460 by the de-serialized sign array produced in block 455. Thereafter, the product resulting from the multiplication is added in block 465 to an up-sampled outcome in block 450 of the resultant decoded grid from the encoded right grid. Finally, the summed grid is returned in block 470. When all instances of the decoding process have completed execution, the final summed grid will be a reconstruction of the original image.

Of note, the process described in connection with FIGS. 3 and 4 may be adapted to address arbitrarily sized images. Specifically, in order to adapt the process of FIGS. 3 and 4 to support arbitrarily sized images, whenever a down-sampling of a grid occurs with a side length of the grid, either a length of a last row or a last column, that is odd numbered, an extra row or column, as the case may be, is added to the grid that reflects a duplicate of the respective last row of the grid or a last column of the grid. Consequently, it is possible to halve the sides to produce an integer-sized down-sampled image.

As an additional note, the process described in connection with FIGS. 3 and 4 may be adapted to encode an original image at increasing quality while decreasing compression ratio. Specifically, in order to adapt the process of FIGS. 3 and 4 to support increased quality compression, after an image is encoded, its reconstruction is subtracted from it to obtain a residual image. This residual is then encoded and decoded as in FIGS. 3 and 4. The combination of the reconstruction of the original image together with this residual thereby forms a higher quality compression of the original image. Better quality of compression may be further achieved by repeating this process encoding increasing numbers of residuals.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An image processing method comprising:
selecting an image in fixed storage of a computer;
loading the selected image into memory of the computer;
representing the loaded image by a processor of the computer in the memory as an initial two-dimensional array of pixel values;
transforming the initial two-dimensional array of pixel values into a hierarchy of progressively axially decremented two-dimensional arrays of signs each of positive or negative, and a pair of one-dimensional values for each 2×2 array of signs amongst the decremented two-dimensional arrays of signs by submitting the initial two-dimensional array to a recursive encoding operation that receives as input, a grid of specified dimension and that produces as output, on condition that the grid has a specified dimension of 1×1, a serialized form of the grid, but on condition that the grid has a specified dimension larger than 1×1, a concatenation of two encoded grids of a dimensionality half that of the specified dimension, and a bit stream representative of a sign array accounting for element-wise signs of positive or negative for an absolute value of a sum of the grid and an up-sampled form of a negated form of a decoded form of an output produced by the encoding operation receiving as input a down-sampled form of the grid, the concatenation after all recursive calls to the encoding operation have unwound, defining the hierarchy; and,
storing in the fixed storage each of the two-dimensional arrays of signs and each pair of one-dimensional values as a compressed form of the selected image.

2. The method of claim 1, wherein the pixel values include at least one color intensity value.

3. The method of claim 2, wherein each color intensity value is a combination of three eight-bit intensity values of a color space.

4. The method of claim 1, further comprising:
loading the hierarchy into the memory of the computer; and,
generating a reconstructed two-dimensional array of pixel values from the hierarchy of progressively axially decremented two-dimensional arrays of signs and the pair of one-dimensional values for each 2×2 array of signs amongst the decremented two-dimensional arrays of sign.

5. The method of claim 1, further comprising:
loading the hierarchy into the memory of the computer; and,
generating a reconstructed two-dimensional array of pixel values from the hierarchy of progressively axially decremented two-dimensional arrays of signs and the pair of one-dimensional values for each 2×2 array of signs amongst the decremented two-dimensional arrays of sign by submitting the hierarchy defined by the concatenation to a recursive decoding operation that receives as input, a data stream indicating a dimension, and that produces as output, on condition that the indicated dimension is 1×1, a de-serialized form of the data stream, but on condition that the indicated dimension is greater than 1×1, a grid of pixel values resulting from a summation of (1) an up-sampled form of a first output grid produced by the decoding operation receiving as input a first portion of the de-concatenated concatenation that is of a dimension half that of the indicated dimension, with (2) a product of a deserialized second sign array portion of the de-concatenated concatenation and an up-sampled form of a third output grid produced by the decoding operation receiving as input a third portion of the de-concatenated concatenation that is of a dimension half that of the indicated dimension, the summation after all recursive calls to the decoding operation have unwound, defining the reconstructed two-dimensional array of pixel values.

6. An image processing data processing system comprising:
a host computer with memory and at least one central processing unit (CPU);
fixed storage storing an image; and,
an image processing module comprising computer program instructions executing in the memory of the computer and adapted to perform:
selecting an image in the fixed storage;
loading the selected image into the memory;
representing the loaded image in the memory by the CPU as an initial two-dimensional array of pixel values;
transforming by the CPU the initial two-dimensional array of pixel values into a hierarchy of progressively axially decremented two-dimensional arrays of signs each of positive or negative, and a pair of one-dimensional values for each 2×2 array of signs amongst the decremented two-dimensional arrays of signs by submitting the initial two-dimensional array to a recursive encoding operation that receives as input, a grid of specified dimension and that produces as output, on condition that the grid has a specified dimension of 1×1, a serialized form of the grid, but on condition that the grid has a specified dimension larger than 1×1, a concatenation of two encoded grids of a dimensionality half that of the specified dimension, and a bit stream representative of a sign array accounting for element-wise signs of positive or negative for an absolute value of a sum of the grid and an up-sampled form of a negated form of a decoded form of an output produced by the encoding operation receiving as input a down-sampled form of the grid, the concatenation after all recursive calls to the encoding operation have unwound, defining the hierarchy; and,
storing by the CPU in the fixed storage each of the two-dimensional arrays of signs and each pair of one-dimensional values as a compressed form of the selected image.

7. The system of claim 6, wherein the pixel values include at least one color intensity value.

8. The system of claim 7, wherein each color intensity value is a combination of three eight-bit intensity values of a color space.

9. The system of claim 6, further comprising:
loading the hierarchy into the memory; and,
generating by the CPU in the memory a reconstructed two-dimensional array of pixel values from the hierarchy of progressively axially decremented two-dimensional arrays of signs and the pair of one-dimensional values for each 2×2 array of signs amongst the decremented two-dimensional arrays of sign.

10. The system of claim 6, further comprising:
loading the hierarchy into the memory; and,
generating by the CPU in the memory a reconstructed two-dimensional array of pixel values from the hierarchy of progressively axially decremented two-dimensional arrays of signs and the pair of one-dimensional values for each 2×2 array of signs amongst the decremented two-dimensional arrays of sign by submitting the hierarchy defined by the concatenation to a recursive decoding operation that receives as input, a data stream indicating a dimension, and that produces as output, on condition that the indicated dimension is 1×1, a de-serialized form of the data stream, but on condition that the indicated dimension is greater than 1×1, a grid of pixel values resulting from a summation of (1) an up-sampled form of a first output grid produced by the decoding operation receiving as input a first grid portion of the de-concatenated concatenation that is of a dimension half that of the indicated dimension, with (2) a product of a deserialized second sign array portion of the de-concatenated concatenation and an up-sampled form of a third output grid produced by the decoding operation receiving as input a third portion of the de-concatenated concatenation that is of a dimension half that of the indicated dimension, the summation after all recursive calls to the decoding operation have unwound, defining the reconstructed two-dimensional array of pixel values.

11. A computer program product for image processing, the computer program product including a non-transitory computer readable storage medium having program instructions embodied therewith, the program instructions executable by a device to cause the device to perform a method including:
selecting an image in fixed storage of a computer;
loading the selected image into memory of the computer;
representing the loaded image by a processor of the computer in the memory as an initial two-dimensional array of pixel values;
transforming the initial two-dimensional array of pixel values into a hierarchy of progressively axially decremented two-dimensional arrays of signs each of positive or negative, and a pair of one-dimensional values for each 2×2 array of signs amongst the decremented two-dimensional arrays of signs by submitting the initial two-dimensional array to a recursive encoding operation that receives as input, a grid of specified dimension and that produces as output, on condition that the grid has a specified dimension of 1×1, a serialized form of the grid, but on condition that the grid has a specified dimension larger than 1×1, a concatenation of two encoded grids of a dimensionality half that of the specified dimension, and a bit stream representative of a sign array accounting for element-wise signs of positive or negative for an absolute value of a sum of the grid and an up-sampled form of a negated form of a decoded form of an output produced by the encoding operation receiving as input a down-sampled form of the grid, the concatenation after all recursive calls to the encoding operation have unwound, defining the hierarchy; and,
storing in the fixed storage each of the two-dimensional arrays of signs and each pair of one-dimensional values as a compressed form of the selected image.

12. The computer program product of claim 11, wherein the pixel values include at least one color intensity value.

13. The method of claim 12, wherein each color intensity value is a combination of three eight-bit intensity values of a color space.

14. The computer program product of claim 12, further comprising:
loading the hierarchy into the memory of the computer; and,
generating a reconstructed two-dimensional array of pixel values from the hierarchy of progressively axially decremented two-dimensional arrays of signs and the pair of one-dimensional values for each 2×2 array of signs amongst the decremented two-dimensional arrays of sign.

15. The computer program product of claim 11, further comprising:
loading the hierarchy into the memory of the computer; and,
generating a reconstructed two-dimensional array of pixel values from the hierarchy of progressively axially decremented two-dimensional arrays of signs and the pair of one-dimensional values for each 2×2 array of signs amongst the decremented two-dimensional arrays of sign by submitting the hierarchy defined by the concatenation to a recursive decoding operation that receives as input, a data stream indicating a dimension, and that produces as output, on condition that the indicated dimension is 1×1, a de-serialized form of the data stream, but on condition that the indicated dimension is greater than 1×1, a grid of pixel values resulting from a summation of (1) an up-sampled form of a first output grid produced by the decoding operation receiving as input a first portion of the de-concatenated concatenation that is of a dimension half that of the indicated dimension, with (2) a product of a deserialized second sign array portion of the de-concatenated concatenation and an up-sampled form of a third output grid produced by the decoding operation receiving as input a third portion of the de-concatenated concatenation that is of a dimension half that of the indicated dimension, the summation after all recursive calls to the decoding operation have unwound, defining the reconstructed two-dimensional array of pixel values.

* * * * *